United States Patent

Quednau et al.

Patent Number: 5,688,858
Date of Patent: Nov. 18, 1997

[54] DISPERSANT

[75] Inventors: Peter Hermann Quednau, Hillegom, Netherlands; Walter Andreas Wulff, Preetz, Germany

[73] Assignee: Efka Chemicals B.V., Hillegom, Netherlands

[21] Appl. No.: 482,008

[22] Filed: Jun. 7, 1995

Related U.S. Application Data

[63] Continuation of Ser. No. 179,760, Mar. 11, 1994, abandoned, which is a continuation of Ser. No. 684,445, Apr. 11, 1991, abandoned, which is a continuation of Ser. No. 241,241, Sep. 2, 1988, abandoned.

[30] Foreign Application Priority Data

Apr. 9, 1987 [NL] Netherlands .................. 8702089

[51] Int. Cl.$^6$ .................. C08L 39/04; C08F 26/06
[52] U.S. Cl. .................. 524/555; 524/562; 524/566; 526/258; 526/262
[58] Field of Search .................. 524/555, 568, 524/562; 526/262

[56] References Cited

U.S. PATENT DOCUMENTS 4,302,561  11/1981  Becher et al. .................. 526/265
5,134,187  7/1992  Aihara .................. 524/555

FOREIGN PATENT DOCUMENTS 0092360  5/1985  Japan .

*Primary Examiner*—Tae Yoon
*Attorney, Agent, or Firm*—Cooper & Dunham LLP

[57] ABSTRACT

The invention relates to a polymer suitable as a dispersant, built up from

A) 0–80 mol % of one or more monomers having the formula

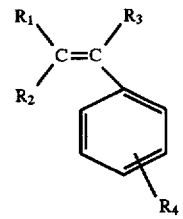

in which $R_1$, $R_2$, $R_3$ and $R_4$ may be the same or different and represent H or alkyl, B) 0–70 mol % of one or more monomers having the formula

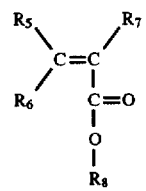

in which $R_5$, $R_6$ and $R_7$ may be the same or different and represent H or alkyl and $R_8$ is alkyl or substituted alkyl, and the alkyl group $R_8$ may also be interrupted by —O— groups, C) 5–50 mol % of one or more monomers containing a heterocyclic group having at least one basic ring nitrogen atom, or to which such a heterocyclic group is attached following polymerization, D) 0–10 mol % of one or more monomers containing one or more groups reactive to cross-linking or coupling, and E) 0–20 mol % of one or more monomers not falling within the groups A–D, the amount of monomers from group A together with monomers containing an acrylate group being at least 20 mol %, as well as organic salts thereof, and also to the use thereof.

8 Claims, No Drawings

DISPERSANT

CROSS-REFERENCE TO RELATED APPLICATIONS

This application is a continuation of U.S. patent application Ser. No. 08/179,760, filed Mar. 11, 1994, now abandoned which in turn is a continuation of U.S. patent application Ser. No. 07/684,445, filed on Apr. 11, 1991, now abandoned which in turn is a continuation of U.S. patent application Ser. No. 07/241,241, filed Sep. 2, 1988 now abandoned.

The present invention relates to polymer compounds suitable as dispersants and organic salts thereof, which contain heterocyclic groups having at least one basic ring nitrogen.

The invention also relates to the use of such polymer compounds for the production of coatings and printing inks, pigment dispersions as well as powdered solids coated with the dispersant according to the invention.

The introduction of solids into liquid media requires high mechanical forces. This depends substantially on the wettability of the solid by the surrounding medium and on the affinity to this medium. For the purposes of reducing these dispersing forces it is conventional to use dispersants facilitating the dispersion. These are mostly surfactants or tensides having an anionic, cationic or a non ionic structure. These agents are directly applied to the solid or added to the dispersing medium in relatively small amounts.

It is further known that these solids tend to flocculate following the dispersion, which nullifies the work earlier done and leads to serious problems. These problems have been accounted for by the London/van der Waal's forces by which the solids attract each other. For the purposes of counteracting these attractive forces absorption layers must be applied to the solid. This is done by using such tensides.

During and following the dispersion there is an interaction between the surrounding medium and the solid particle, resulting in a desorption of the tenside by exchange for the surrounding medium present in a higher concentration. This medium, however, is not capable in most cases of building up such stable absorption layers, resulting in a crash of the whole system. This becomes apparent by the increase in viscosity in liquid systems, losses of gloss and color shifts in lacquers and coatings as well as insufficient color force development in pigmented synthetics.

To solve this problem, e.g., EP-A 154,678, EP-A 74080, U.S. Pat. No. 4,032,698 and DE-A 24 38 414 propose dispersants. These dispersants, however, only lead to a partial solution, particularly with respect to the miscibility without flocculation of different pigments with each other, such as organic pigments and inorganic pigments. Moreover, the pigment pastes prepared by the methods defined tend to interact with the surrounding medium, e.g., after use in lacquers. Consequently, it can be assumed that the absorption layers built up only have insufficient stability against desorption. A number of dispersants proposed in these publications further have the drawback that the storage stability is too poor, which leads to precipitation, phase separation, crystallization, etc. This results in that such products are inhomogeneous and useless in practice after a relatively short time.

The object of the present invention is to find dispersants which do not show the above described drawbacks or in which these drawbacks have been considerably reduced.

The second object is to find a dispersant having excellent compatibility with a wide range of different binders, especially binders on a polyacrylate basis and air drying alkyd resins.

It is also an object of the invention to find a dispersant capable of being used in the production of binder-free pigment dispersions without further binder additives during the dispersing process.

These objects are attained according to the invention by a polymer suitable as a dispersant, built up from A) 0–80 mol % of one or more monomers having the formula

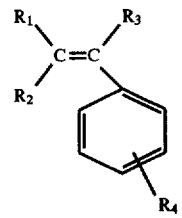

in which $R_1$, $R_2$, $R_3$ and $R_4$ may be the same or different and represent H or alkyl, B) 0–70 mol %, or more preferably 25 to 70 mol %, of one or more monomers having the formula

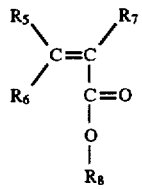

in which $R_5$, $R_6$ and $R_7$ may be the same or different and represent H or alkyl and $R_8$ is alkyl or substituted alkyl, and the alkyl chain may also be interrupted by —O— groups, C) 5–50 mol % of one or more monomers containing a heterocyclic group having at least one basic ring nitrogen atom or to which such a heterocyclic group is attached following polymerization, D) 0–10 mol % of one or more monomers containing one or more groups reactive to crosslinking, and E) 0–20 mol % of one or more monomers not falling within the groups A–D, the amount of monomers from group A together with monomers containing an acrylate group being at least 20 mol %, as well as organic salts thereof.

The polymers according to the invention have excellent compatibility with all kinds of binders for coatings and printing inks, more in particular with binders on a polyacrylate basis and on an alkyd basis.

Pigment dispersions stabilized with the polymers according to the invention are distinguished by a high resistance to flocculation, good rheological properties as well as a proper strength of color and a high gloss.

The polymers according to the invention can be added, as dispersants in relatively small amounts, to the material to be ground for the dispersing process. The optimum activity of the polymer compound according to the invention is obtained at concentrations of preferably 1 mg to 10 mg, based on 1 m$^2$ BET surface of the pigment.

The dispersants according to the invention can also be used without further binder additives during the dispersing process.

The dispersant then adopts the function of a dispersing resin. Thus binder-free pigment dispersions are obtained which, in the further applications thereof in coatings and printing inks, have excellent compatibility and do not entrain unnecessary, disturbing dispersing resins.

Optimum results are obtained at a dispersant/pigment weight ratio of 1:1.5 to 1:3 with organic pigments and 1:4 to 1:8 with inorganic pigments.

The products according to the invention consist of a polymer chain having attached thereto the heterocyclic groups with basic nitrogen atoms. Such a chain can be obtained either by polymerizing-in compounds containing both a vinyl and such a heterocyclic group, or by later attaching a heterocyclic group to the polymer chain containing corresponding reactive groups.

Preferred are compounds with basic nitrogen groups having a pKa value of 2 to 14, more in particular 5 to 14 and most preferably 5 to 12. These pKa values relate to the measurement thereof at 25° C. in a 0.01 molar concentration in water. These basic groups impart to the dispersants according to the invention a basicity as is also known in this technical field. These basic groups allow the dispersants to form organic salts too. The dispersants can therefore be used in the form of such salts.

These salts are obtained by neutralization of the polymer with organic acids, e.g., aromatic acids having not more than 25 C atoms or aliphatic and cyclo-aliphatic acids having not more than 22 C atoms. Preference is given to salts of the polymer with organic monocarboxylic acids.

Suitable compounds to be polymerized-in are, e.g., vinylimidazole, vinylpyridine, 2-methyl-N-vinylimidazole, vinylpyrrolidone and vinylcarbazole.

Suitable compounds containing at least one basic nitrogen atom and capable of being attached to a polymer chain are described in, among others, EP-A 154,678.

Examples are inter alia: 1-(2-hydroxyethyl)-pyrrolidine, 2-(1-pyrrolidyl)-ethylamine, 2-(1-piperidyl)-ethylamine, 1-(2-hydroxyethyl)-piperidine, 1-(2-aminopropyl)-piperidine, N-(2-hydroxyethyl)-hexamethylenimine, 4-(2-hydroxyethyl)-morpholine, 2-(4-morpholinyl)-ethylamine, 4-(3-aminopropyl)-morpholine, 1-(2-hydroxyethyl)-piperazine, 1-(2-aminoethyl)-piperazine, 1-(2-hydroxyethyl)-2-alkylimidazoline, 1-(3-aminopropyl)-imidazole, (2-aminoethyl)-pyridine, (2-hydroxyethyl)-pyridine, (3-hydroxypropyl)-pyridine, (hydroxymethyl)-pyridine, N-methyl-2-hydroxy-methyl-piperidine, 1-(2-hydroxyethyl)-imidazole, 2-amino-6-methoxybenzothiazole, 4-aminomethyl-pyridine, 4-amino-2-methoxypyrimidine, 2-mercaptopyrimidine, 2-mercapto-benzimidazole, 3-amino-1,2,4-triazole, 2-isopropyl-imidazole, 2-ethyl-imidazole, 4-methyl-imidazole, 2-methyl-imidazole, 2-ethyl-4-methyl-imidazole, 2-phenyl-imidazole and 4-nitro-imidazole.

For use in the polymers according to the invention it is necessary that these compounds contain at least one reactive group. This may be, for instance, —OH, —NH$_2$, —NHR, —COOH and —SH. In general, a hydrogen atom reactive to epoxy or isocyanate is required. By means of a reaction with diisocyanate, diepoxyd, diol, dicarboxylic acid, hydroxycarboxylic acid, aminocarboxylic acid, amino-ol, etc. the heterocyclic compound can be coupled to the polymer chain. Tri- or higher functional compounds can also be used, but this does not give important advantages. It is of course also possible to operate without a coupling compound and to directly attach the heterocyclic groups-containing compound to the chain. The compounds polymerizable-in that are suited for this purpose are, e.g., 2-hydroxyethylacrylate, 2-hydroxypropylacrylate, glycidylmethacrylate, 2-hydroxyethylmethacrylate, 2-hydroxypropylmethacrylate, acrylic acid, methacrylic acid, alkoxylated —OH-functional reaction products thereof, etc.

The content of heterocyclic groups-containing monomers, or monomers to which the heterocyclic groups can be attached, ranges between 5 and 50 mol %, preferably between 25 and 40 mol %.

Preferred is the use of vinylimidazole, because in the first place it is easiest with this compound to prepare the polymers and in the second place the dispersants prepared therewith have excellent properties.

The other components of the polymer chain aim at providing optimum compatibility with binders and/or solvents as conventional for coatings and printing inks.

The polymer chain can advantageously comprise at least one monomer of the acrylate type. Suitable monomers are the esters of acrylic acid and methacrylic acid as well as reaction products of ethylene oxide and/or propylene oxide therewith. In this respect it is observed that such reaction products may be both OH- and alkyl-terminated. It is intended in this connection that these reaction products be either alkyl-terminated or, if they are OH-terminated, so little reactive that they do not give rise to further reactions. If these alkoxylated products are reactive, they should be comprised by groups C or D.

Monomers that can be suitably used are, e.g., methyl methacrylate, ethyl methacrylate, n-butyl methacrylate, isobutyl methacrylate, hexyl methacrylate, 2-ethyl hexyl methacrylate, dimethyl aminoethyl methacrylate, cyclohexyl methacrylate, methylacrylate, isobornyl methacrylate, ethyl acrylate, butyl acrylate, 2-ethyl hexyl acrylate, cetyl methacrylate, stearyl methacrylate, behenyl methacrylate, polypropylene glycol monomethacrylate, polyethylene glycol monomethacrylate and EO-PO-monomethacrylate.

The selection of the monomers is determined by the compatibility of the polymer chain with binder/solvent. One of the monomers preferred is methyl methacrylate, since this monomer provides good compatibility and good film properties. Monomer mixtures can also be used.

The amount of monomer of the acrylate type ranges between 0 and 70 mol %, the amount being determined by inter alia the molecular weight of the monomers. In case of a higher molecular weight, e.g., monomers with an EO—PO chain, a smaller amount is used on a molar base.

The presence of the monomer of the acrylate type is not absolutely necessary but is clearly preferred. In specific cases, however, it is possible to abandon the presence of these monomers. If the polymer chain already contains a large amount of monomers of another acrylate type, e.g., from group C, such as glycidyl methacrylate, the process can be carried out without separately added acrylate.

A group of monomers that may be present concerns the vinylaromatic monomers, such as styrene, α-methyl styrene, vinyl toluene, etc. In general, this group can be defined by the formula

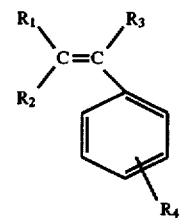

in which $R_1$, $R_2$ and $R_3$ may be H or ($C_1$–$C_4$) alkyl. The nucleus substitution $R_4$ may be absent ($R_4$=H) or consist of methyl or higher alkyl (such as $C_2$–$C_{18}$).

This group of monomers affects the compatibility with the binders and solvents. Monomers from this group can be used in amounts up to 80 mol %. Preferred are amounts up to 25 mol %, more in particular 5–15 mol %.

In specific cases the monomers from this group of vinylaromatic compounds can replace the monomers of the acrylate type completely or partially. In this connection, however, the amount of monomers from group A together with monomers containing acrylate groups should be at least 20 mol %. The universal compatibility, however, is poorer if only vinylaromatic monomers are present.

A next group of monomers is the group used for intercoupling two or more substantially linear polymer chains. In specific cases it may be advantageous, e.g., from the viewpoint of preparation, to prepare relatively low molecular polymers and to interconnect them by means of reactive monomers. For this purpose, in principle the same monomers can be used as described above for attaching heterocyclic groups to the polymer chain.

In general, these monomers are used only in those cases in which a crosslinking or coupling is to be obtained indeed. It is of course possible to combine the monomer groups C and D and to use excess monomer relative to the heterocyclic groups. Thus it is preferably possible first to attach the heterocyclic groups and then to carry out the coupling process.

The amount of monomers from group D, is preferably 0 to 10 mol % on the desired molecular weight. In general, not more than about 2–4 reactive groups are required per polymer chain. The coupling can be effected by reaction of the polymerized-in monomers with each other or by using a di- or trifunctional compound as described in relation to the attachment of the heterocyclic group to the chain.

The last group of monomers present only in relatively small amounts, i.e. 0–20 mol %, preferably 0–10 mol %, more in particular 0–5 mol %, preferably 0 mol %, comprises the monomers that are not comprised by groups A–D, such as acrylamide, methacrylamide, vinyl ester, vinyl ether, acrylonitrile, etc. These monomers can be used for finely adjusting the dispersant properties.

The dispersants can be prepared in the conventional manner, e.g., by mass or solution polymerization. The polymerization in a solvent is preferred in view of the controllability of the polymerization and the viscosity of the final product. Suitable solvents are DMSO, THF, DMF, ethyl, propyl, butyl, acetate, benzene, toluene, xylene, N-butanol, isobutanol, isopropanol, MEK, MIBK, acetone, etc.

The monomers are preferably polymerized using a radical reaction, by addition of peroxides, optionally in the presence of redox systems.

The polymerization time depends on the temperature and the desired final product properties but is preferably within the range of from 0.5 to 10 hours at temperatures ranging from 50° to 190° C. The polymerization can be carried out continuously, discontinuously or semicontinuously. If it is preferred to obtain a polymer chain having random distribution of monomers, all of the monomers together will be preferably added to the reaction mixture. This may be done in one portion or in the course of time.

On the basis of the reactivity of the monomers, which is known, a skilled worker can control the polymerization so as to obtain the desired distribution.

The present polymers suitable as dispersants have an excellent dispersing effect. The compatibility with all types of binders for coatings and printing inks is excellent. By suitably selecting monomers a substantially universal dispersant is obtained.

The dispersants according to the invention can be used for the production of aqueous and non-aqueous coatings, such as paints and printing inks. The dispersants are not water-soluble but may have a self-emulsifying effect in water, so that these are suitable for use in aqueous coatings and printing inks too. In this connection aqueous coatings and printing inks, as used herein, also refer to those products which partially comprise organic cosolvents.

The dispersant according to the invention is surprisingly superior to known agents built up on the basis of isocyanate, although rather simple raw materials have been used.

With the dispersants according to the invention pigments that are hard to stabilize can be stabilized without any problems. Also pigment mixtures can be stabilized without causing problems. Following stabilization with the dispersants according to the invention the pigments show a very high resistance to flocculation and impart to a lacquer film containing the pigments an excellent gloss.

Pigments used in this field are the organic and inorganic pigments insoluble in the employed liquid, e.g., soot, polycyclic pigments, iron oxides, etc.

The invention also relates to pigment dispersions, i.e., mixtures of pigment, dispersant according to the invention and water and/or non-aqueous liquid. These disperions are sometimes also referred to as binder-free pigment dispersions or pigment slurries. As non-aqueous liquids, use is made of the organic solvents conventional in the field of coatings and printing inks. The amounts of pigment range between 10 and 70% by weight, and the amounts of dispersant range between 1 and 10% by weight.

EXAMPLE 1

In a reaction flask with reflux condenser suitable for polymerization were dissolved in 9.86 g xylene and 4.93 g methoxypropyl acetate 2.84 g vinyl toluene, 4.55 g isobutyl methacrylate, 7.36 g ethyl hexyl acrylate, 5.20 g hydroxyethyl methacrylate, 1.80 g polyethylene glycol monomethacrylate having a molecular weight of approximately 400 and 0.44 g ditertiary butyl peroxide. Polymerization was effected at the boiling point of the mixture while stirring and introducing an inert gas. At the end of the polymerization 9.79 g isophoron diisocyanate were dissolved in 16.58 g isobutyl acetate and 16.58 g methoxypropyl acetate, and the remaining free NCO groups were then converted with 3.60 g polyethylene glycol monomethacrylate having a molecular weight of approximately 400 and 4.51 g 1-(3-aminopropyl)imidazole.

The solid content was then adjusted to 40% by weight with butylacetate.

EXAMPLE 2

In the manner comparable with Example 1 3.54 g vinyl toluene, 5.69 g isobornyl methacrylate, 9.20 g 2-ethyl hexyl methacrylate, 7.15 g hydroxy ethyl methacrylate, and 1.28 g ditertiary butylperoxide dissolved in 11.94 g xylene and 5.97 g methoxypropyl acetate were polymerized.

Subsequently, 12.23 g isophoron diisocyanate dissolved in 20.36 g butylacetate and 20.36 g methoxypropyl acetate were added. The then remaining free NCO groups were converted with 4.50 g polyethylene glycol monomethacrylate having a molecular weight of approximate 400 and 3.78 g 3-amino-1,2,4-triazole in 11.34 g N-methylpyrrolidone.

The solid content was then adjusted to 40% by weight with butylacetate.

EXAMPLE 3

In the manner described in Example 1 6.66 g isobornyl methacrylate, 5.46 g cyclohexyl methacrylate, 6.40 g butylacrylate, and 7.85 g hydroxy ethyl methacrylate were polymerized with 1.28 g ditertiary butyl peroxide dissolved in 11.98 g xylene and 5.99 g methoxypropyl acetate. To this polymer containing hydroxyl groups 12.23 g isophoron diisocyanate dissolved in 20.4 g butylacetate and 20.40 g methoxypropyl acetate were added. The free NCO groups were then converted with 4.50 g polyethylene glycol monomethacrylate and 5.54 g 2-(2-pyridyl)-ethanol.

The solid content was then adjusted to 40% by weight with xylene.

EXAMPLE 4

In the manner described in Example 1 a polymerization of 3.78 g vinyl toluene, 5.69 g isobutyl methacrylate, 7.38 g 2-ethyl hexyl methacrylate, 7.97 g stearyl methacrylate, 4.55 g glycidyl methacrylate and 0.59 g ditertiary butylperoxide was effected in 14.98 g xylene and 4.99 g methoxypropyl acetate.

At the end of the polymerization 24.97 g butylacetate were added, and 4.01 g 1-(3-aminopropyl)imidazole were added to the polymer.

EXAMPLE 5

In the manner described in Example 1 a polymerization of 6.66 g isobornyl methacrylate, 5.46 g cyclohexyl methacrylate, 9.96 g stearyl methacrylate, 9.22 g 2-ethyl hexyl methacrylate, 5.69 g glycidyl methacrylate and 0.74 g ditertiary butylperoxide was effected in 18.86 g xylene and 6.29 g methoxypropyl acetate.

At the end of the polymerization 18.94 g butyl acetate were added, and 4.05 g 3-mercapto-1,2,4-triazole dissolved in 16.20 g N-methyl pyrrolidone were added to the polymer.

EXAMPLE 6

In the manner described in Example 1 a polymerization of 12.0 g methyl methacrylate, 32.76 g cyclohexyl methacrylate, 35.84 g butylacrylate, 18.82 g vinyl imidazole and 2.0 g tertiary butyl perbenzoate was effected in 50.71 g xylene and 16.91 g n-butanol.

The solid content was adjusted to 40% by weight with butyl acetate.

EXAMPLE 8

In 15.67 g secondary butanol and 47.0 g butyl acetate were polymerized in the manner described in Example 1: 29.97 g isobornyl methacrylate, 9.36 g styrene, 38.71 g 2-ethyl hexyl acrylate, 14.12 g vinyl imidazole, 0.62 g tertiary butyl-per-2-ethyl hexoate and 1.23 g tertiary butyl perbenzoate.

At the end of the polymerization the solid content was adjusted to 50% by weight by means of butyl acetate.

EXAMPLE 9

In 45.08 g xylene and 22.54 g n-butanol, 12.00 g methyl methacrylate, 32.76 g cyclohexyl methacrylate, 35.84 g butyl acrylate, 18.82 g vinyl imidazole and 2.0 g tertiary butyl perbenzoate were polymerized in the manner described in Example 1.

At the end of the polymerization the solid content was adjusted to 50% by weight by adding 33.80 g xylene.

EXAMPLE 10

In 47.00 g toluene and 15.67 g n-butanol, 29.97 g isobornyl methacrylate, 9.36 g styrene, 38.71 g 2-ethyl hexyl acrylate, 14.12 g vinyl imidazole and 11.85 g tertiary butyl perbenzoate were polymerized in the manner described in Example 1.

At the end of the polymerization a polymer solution was obtained having a solid content of 60% by weight.

EXAMPLE 11

In 43.75 g xylene and 14.59 g n-butanol, 23.31 g isobornyl methacrylate, 31.35 g butyl acrylate, 10.92 g styrene, 3.71 g acrylonitrile, 16.47 g vinyl imidazole and 1.72 g tertiary butyl perbenzoate were polymerized.

At the end of the polymerization the solid content of the polymer solution was adjusted to 50% by weight by adding xylene.

EXAMPLE 12

In the manner described in Example 1, 19.98 g isobornyl methacrylate, 10.62 g vinyl toluene, 30.42 g 2-ethyl hexyl acrylate, 6.75 g polyethylene glycol monomethacrylate, 16.38 g cyclohexyl methacrylate, 15.53 g vinyl imidazole, 0.67 g tertiary butyl peroctoate and 1.34 g tertiary butyl perbenzoate were polymerized in 50.85 g butyl acetate and 16.95 g secondary butanol.

At the end of the polymerization the solid content of the polymer solution was adjusted to 50% by weight with butyl acetate.

EXAMPLE 13

In 98.67 g butyl acetate and 19.74 g n-butanol the following substances were polymerized in the manner described in Example 1: 19.98 g isobornyl methacrylate, 10.92 g cyclohexyl methacrylate, 10.62 g vinyl toluene, 15.0 g methyl methacrylate, 6.75 g polyethylene glycol monomethacrylate, 14.12 g vinyl imidazole and 1.56 g tertiary butyl perbenzoate.

At the end of the polymerization the solid content of the solution was adjusted to 40% by weight by adding butyl acetate.

To evaluate the behaviour of the dispersants according to the invention, these were used in three different lacquer systems, while also comparing with the dispersant according to Example 14 of EP-A-154,678.

The compositions of the three lacquer systems are listed in the following Table 1.

TABLE 1 lacquer system A = 2 components acrylate.
Component 1

| | | |
|---|---|---|
| MACRYNAL 510 N, 60% (acrylic resin Hoechst, TM) | 21.98 | parts by wt. |
| ethyl glycol acetate | 5.54 | |
| SOLVESSO 100 (aromatic solvent, TM) | 8.89 | |
| butyl acetate 99/100% | 8.00 | |
| pigment, organic | 1.80 –5.00 | |
| dispersant, 50% | 1.25 –2.50 | |
| (ditto, 25% | 2.50 –5.00) | |
| MACRYNAL 510 N, 60% | 39.25 | |
| DBTL 1% | 0.26 | |
| xylene | 4.29 | |
| butyl acetate, 99/100% | 4.29 | |
| | 100.00 | parts by wt. |

TABLE 1-continued

| Component 2 | | |
|---|---|---|
| Hardener, DESMODUR N 75 (isocyanate, Bayer) | 25.00 | |
| butyl acetate, 99/100% | 20.00 | |
| | 145.00 | |
| lacquer system B = enamel on a polyester basis | | |
| DYNAPOL H 700, 60% (oil-free polyester TM) | 27.50 | parts by wt. |
| pigment, organic, | 1.80 –5.00 | |
| SOLVESSO 100 | 8.00 | |
| n-butanol | 4.00 | |
| dispersant, 50% | 1.08 –2.50 | |
| (ditto, 25% | 2.16 –5.00) | |

TABLE 1-continued

| anti-skinning agent | 1.00 |
|---|---|
| | 100.00 parts by wt. |

*see table 3

By using these three lacquer systems as well as four pigments that are known to be hardly dispersible, a number of pigmented lacquers were prepared using a dispersant according to the present invention, while also comparing with a dispersant according to the state of the art. The results are listed in Table 2, in the last two columns of which the stability of the pigmented lacquer systems is indicated by a scale of 1–6. A visual evaluation of the behaviour of the lacquer when placed on a glass sheet is given in the column "behaviour film". A visual evaluation of the behaviour of the liquid lacquer is given in the column "behaviour lacquer".

TABLE 2

| Pigment | Parts by wt. of pigment | Lacquer system | Dispersant (DM) | Parts by wt. DM, 100% | Behaviour film | Behaviour lacquer |
|---|---|---|---|---|---|---|
| Gas soot FW 200 | 1.80 | A | Example 12 | 0.54 | 1 | 1 |
| DEGUSSA | | | comp. ex. | 0.54 | 2 | 6 |
| | | B | example 12 | 0.54 | 1 | 1 |
| | | | comp. ex. | 0.54 | 4 | 4 |
| | | C | example 12 | 0.54 | 1 | 1 |
| | | | comp. ex. | 0.54 | 3 | 4 |
| PALIOGEN-ROT | 5.00 | A | example 12 | 1.00 | 3 | 1 |
| L 3910 RD | | | comp. ex. | 1.00 | 4 | 6 |
| BASF | | B | example 12 | 1.00 | 3 | 3 |
| | | | comp. ex. | 1.00 | 4 | 4 |
| | | C | example 12 | 1.00 | 1 | 1 |
| | | | comp. ex. | 1.00 | 4 | 5 |
| QUINDO VIOLET | 5.00 | A | example 12 | 0.63 | 1 | 1 |
| RV 6926 | | | comp. ex. | 0.63 | 3 | 6 |
| BAYER | | B | example 12 | 0.63 | 1 | 1 |
| | | | comp. ex. | 0.63 | 4 | 6 |
| | | C | example 12 | 0.63 | 1 | 1 |
| | | | comp. ex. | 0.63 | 4 | 3 |
| IRGAZIN DPP | 5.00 | A | example 12 | 1.25 | 2 | 1 |
| ROT BO | | | comp. ex. | 1.25 | 6 | 6 |
| CIBA-GEIGY | | B | example 12 | 1.25 | 1 | 2 |
| | | | comp. ex. | 1.25 | 6 | 6 |
| | | C | example 12 | 1.25 | 1 | 1 |
| | | | comp. ex. | 1.25 | 6 | 5 |

Note 1: excellent pigment stability no flocculation
Note 6: no pigment stability complete flocculation
Comparative example: Example 14 EP-A 154,678

TABLE 1-continued

| DYNAPOL H 700, 60% | 25.40 | |
|---|---|---|
| MAPRENAL 650, 55% (melamine resin, TM) | 25.52 | |
| SOLVESSO 100 | 2.08 | |
| | 100.00 | parts by wt. |
| lacquer system C = air-drying lacquer on an alkyd resin basis | | |
| ALFTALAT AM 649 m, 60% (air-drying alkyl resin, TM) | 22.00 | parts by wt. |
| test benzine K 30* | 16.00 | |
| pigment | 1.80 –5.00 | |
| dispersant, 50% | 1.08 –2.50 | |
| (ditto, 25%, 2.16–5.00) | | |
| ALFTALAT AM 649 m, 60% | 39.20 | |
| test benzine K 30 | 12.10 | |
| OCTA SOLIGEN KBM fl. 1:1 (siccative TM) | 2.20 | |

To evaluate the compatibility of the dispersants according to the invention, it was determined to what extent the dispersants could be diluted with a number of types of test benzines ("white spirit"). In the following Table 3 it is indicated how many parts of the different test benzines can be added to the dispersant according to Example 12, without the occurrence of precipitation or flocculation.

TABLE 3

| | Example 12 |
|---|---|
| Test benzine K 21* | 7 |
| Test benzine K 30** | 5 |
| Test benzine K 60*** | 3 |

*boiling range 135–175° C.
**boiling range 145–200° C.
***boiling range 180–211° C.

For the purposes of comparison it may be indicated that the product used in Table 2 for comparative purposes was hardly soluble in these substances, since precipitation already occurred when adding less than 1 part by weight of test benzine to 1 part by weight of the binder.

To determine the compatibility with oil-modified alkyl resins 1 part of dispersant (solid) was added to 10 parts by weight (solid) of two different binders. The compatibility of the dispersant according to the invention with two oil-modified alkyd resins is indicated in Table 4.

TABLE 4

|  | Example 12 | comparative example |
|---|---|---|
| ALFTALAT AM 649 m, 60% Hoechst AG | + | − |
| ALKYDAL M 48,55% Bayer AG. | + | − |

+ = compatible
− = incompatible

To determine the storage stability at room temperature of the binders according to the invention, the binder according to Example 12 and the binder according to Example 14 of European patent application 154,678 were stored at room temperature. After 8 days, 30 days and 150 days the condition of the binders was evaluated.

The binder according to Example 12 was still clear and liquid after 8, 30 and 150 days.

The comparative example showed turbidity after 8 days, turbidity and thickening after 30 days, and turbidity and solidification after 150 days.

It is apparent from the above tests that the dispersants according to the invention show a clearly improved dispersing effect as well as an improved compatibility with oil-modified alkyd resins, improved solubility in aliphatic hydrocarbons and an improved storage stability.

We claim:

1. A pigment dispersion consisting essentially of:

at least one pigment; water and/or a nonaqueous liquid; and a polymeric water insoluble dispersant which comprises:

A) 5–15 mol % of styrene, vinyltoluene or α-methylstyrene;

B) 25–70 mol % of one or more monomers having the formula:

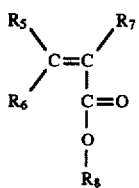

wherein $R_5$, $R_6$ and $R_7$ may be the same or different and represent H or an alkyl group and $R_8$ is an alkyl group and wherein the alkyl group $R_8$ may be interrupted by —O— groups;

C) 25–40 mol % of vinylimidazole monomer;

D) 0–10 mol % of one or more monomers containing one or more groups reactive to cross-linking or coupling; and E) 0–10 mol % of acrylamide, methylacrylamide, vinyl ester, vinyl ether or acrylonitrile.

2. A polymeric dispersant in accordance with claim 1 wherein the monomer of Group (A) is styrene.

3. A polymeric dispersant in accordance with claim 1 wherein the monomer of Group (A) is vinyl toluene.

4. A polymeric dispersant in accordance with claim 1 wherein the monomer of Group (A) is α-methylstyrene.

5. A dispersant as claimed in claim 1, in which the monomers from group B are selected from methyl methacrylate, ethyl methacrylate, n-butyl methacrylate, isobutyl methacrylate, hexyl methacrylate, 2-ethyl hexyl methacrylate, dimethyl aminoethyl methacrylate, cyclohexyl methacrylate, methylacrylate, isobornyl methacrylate, ethyl acrylate, butyl acrylate, 2-ethyl hexyl acrylate, cetyl methacrylate, stearyl methacrylate, behenyl methacrylate, polypropylene glycol monomethyacrylate, polyethylene glycol monomethacrylate and ethylene oxide-propylene oxide monomethacrylate.

6. A dispersant as claimed in claim 1, in which the content of monomers from group D is greater than 0 mol % and the monomers are selected from 2-hydroxyethyl acrylate, 2-hydroxypropyl acrylate, glycidyl methacrylate, 2-hydroxyethyl methacrylate, 2-hydroxypropyl methacrylate, acrylic acid, methacrylic acid and alkoyxlated reaction products of said compounds.

7. A pigment dispersion consisting essentially of:

at least one pigment;

water and/or a nonaqueous liquid; and a water insoluble polymeric dispersant which comprises:

A) 5–15 mol % of vinyltoluene monomers;

B) 25–70 mol % of isobornyl methacrylate, 2-ethylhexylacrylate, polyethylene glycol monomethacrylate, or cyclohexyl methacrylate;

C) 25–40 mol % of vinylimidazole monomer; and

D) 0–10 mol % of tertiary butyl peroctoate or tertiary butyl perbenzoate.

8. A pigment dispersion consisting essentially of:

at least one pigment;

water and/or a nonaqueous liquid; and a water insoluble polymeric dispersant which comprises:

A) 5–15 mol % of vinyltoluene monomer;

B) 25–70 mol % of isobutyl methacrylate, cyclohexyl methacrylate, methyl methacrylate, polypropylene glycol monomethacrylate, polyethylene glycol monomethacrylate, methylacrylate, 2-ethyl hexyl acrylate, or hydroxyethylmethacrylate; and C) 25–40% of vinylimidazole monomers.

* * * * *

UNITED STATES PATENT AND TRADEMARK OFFICE
CERTIFICATE OF CORRECTION

PATENT NO. : 5,688,858
DATED : November 18, 1997
INVENTOR(S) : Peter Hermann Quendau and Walter Andreas Wulff It is certified that error appears in the above-identified patent and that said Letters Patent is hereby corrected as shown below:

TITLE PAGE:
      Under "Assignee," after "Netherlands" insert --and Buro W. Wulff, Preetz, Federal Republic of Germany--.

Signed and Sealed this

Twenty-seventh Day of October, 1998

*Attest:*

BRUCE LEHMAN

*Attesting Officer*     *Commissioner of Patents and Trademarks*